US012728464B2

(12) United States Patent
Kawashima

(10) Patent No.: US 12,728,464 B2
(45) Date of Patent: Sep. 8, 2026

(54) CUTTING INSERT, ROTARY TOOL, AND METHOD FOR MANUFACTURING MACHINED PRODUCT

(71) Applicant: KYOCERA CORPORATION, Kyoto (JP)

(72) Inventor: Kouji Kawashima, Kusatsu (JP)

(73) Assignee: KYOCERA CORPORATION, Kyoto (JP)

( * ) Notice: Subject to any disclaimer, the term of this patent is extended or adjusted under 35 U.S.C. 154(b) by 686 days.

(21) Appl. No.: 18/043,335

(22) PCT Filed: Sep. 8, 2021

(86) PCT No.: PCT/JP2021/033000
§ 371 (c)(1),
(2) Date: Feb. 28, 2023

(87) PCT Pub. No.: WO2022/054829
PCT Pub. Date: Mar. 17, 2022

(65) Prior Publication Data

US 2023/0364689 A1 Nov. 16, 2023

(30) Foreign Application Priority Data

Sep. 9, 2020 (JP) ................................ 2020-151475

(51) Int. Cl.
*B23B 51/02* (2006.01)
*B23B 51/00* (2006.01)

(52) U.S. Cl.
CPC .......... *B23B 51/0003* (2022.01); *B23B 51/02* (2013.01); *B23B 2251/04* (2013.01);
(Continued)

(58) Field of Classification Search
CPC ........ B23B 2251/085; B23B 2251/087; B23B 2251/14; B23B 2251/48; B23B 2251/406;
(Continued)

(56) References Cited

U.S. PATENT DOCUMENTS 4,802,799 A * 2/1989 Rachev .................. B23B 51/02 407/62
4,984,944 A * 1/1991 Pennington, Jr. ..... E21B 10/445 175/420.1
(Continued)

FOREIGN PATENT DOCUMENTS

CN 201371263 Y * 12/2009
CN 103025461 A 4/2013
(Continued)

*Primary Examiner* — Ryan Rufo
(74) *Attorney, Agent, or Firm* — HAUPTMAN HAM, LLP

(57) ABSTRACT

A rotary tool according to an aspect includes a body, a flank face positioned at a side of a tip end of the body, a flute extending from the flank face toward a rear end of the body, and a ridge line positioned at an intersection of the flank face and the flute. The ridge line includes a recessed portion recessed toward the rear end of the body, an inner edge extending from the recessed portion toward the tip end of the body, and an outer edge extending from the recessed portion toward an outer periphery of the body. The flute includes a recessed groove extending along the outer edge. The recessed groove is connected to the recessed portion and the outer edge, and is separated from the inner edge.

14 Claims, 14 Drawing Sheets

(52) U.S. Cl.
CPC ..... *B23B 2251/085* (2013.01); *B23B 2251/14* (2013.01); *B23B 2251/202* (2013.01)

(58) Field of Classification Search
CPC ................ B23B 51/0003; B23B 51/02; B23C 2210/086
See application file for complete search history.

(56) References Cited

U.S. PATENT DOCUMENTS

| | | | | |
|---|---|---|---|---|
| 5,160,232 | A * | 11/1992 | Maier | B23B 51/02 407/54 |
| 7,237,986 | B2 * | 7/2007 | Anjanappa | B23B 51/02 408/230 |
| 11,969,804 | B2 * | 4/2024 | Schur | B23B 51/0486 |
| 2013/0071192 | A1 | 3/2013 | Kuroda | |
| 2017/0274461 | A1 * | 9/2017 | Mabuchi | B23B 51/02 |
| 2018/0221967 | A1 * | 8/2018 | McKinley | B23B 51/00035 |
| 2021/0129232 | A1 * | 5/2021 | Bunting | B23B 51/02 |
| 2021/0205899 | A1 * | 7/2021 | Ogawa | B23B 51/02 |
| 2021/0283696 | A1 * | 9/2021 | Sterling | B23B 51/06 |
| 2022/0184723 | A1 * | 6/2022 | Beer | B23G 5/20 |
| 2023/0147380 | A1 * | 5/2023 | Kawabata | B23B 27/20 408/227 |

FOREIGN PATENT DOCUMENTS

| | | | | |
|---|---|---|---|---|
| FR | 725363 | A * | 5/1932 | |
| FR | 2421022 | A1 * | 10/1979 | |
| JP | S58191913 | U | 12/1983 | |
| JP | S63114808 | A | 5/1988 | |
| JP | 200417264 | A | 1/2004 | |
| JP | 2004017264 | A * | 1/2004 | |
| JP | 201678209 | A | 5/2016 | |
| JP | 6359419 | B2 * | 7/2018 | |
| WO | WO-2016047803 | A1 * | 3/2016 | B23B 51/00 |
| WO | 2019189415 | A1 | 10/2019 | |

* cited by examiner

CUTTING INSERT, ROTARY TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/033000 filed on Sep. 8, 2021, which claims priority to Japanese Patent Application No. 2020-151475, filed on Sep. 9, 2020.

TECHNICAL FIELD

The present disclosure relates to a cutting insert and a rotary tool to be used in machining. Examples of rotary tools include drills and end mills.

BACKGROUND OF INVENTION

For example, drills such as a drill described in Patent Document 1 are known as rotary tools to be used for machining workpieces such as those made of metal. In the drill described in Patent Document 1, a cutting edge and a chip breaker groove are formed at a tip end portion of the drill. The cutting edge is formed with a cutout dividing the cutting edge into an inner peripheral edge at an inner peripheral side and an outer peripheral edge at an outer peripheral side. The chip breaker groove is formed along the cutting edge from the outer peripheral edge to a part of the inner peripheral edge or over the entire inner peripheral edge.

CITATION LIST

Patent Literature

Patent Document 1: JP 58-191913 UM-A

SUMMARY

Problem to be Solved

In recent years, a cutting insert and a rotary tool have been required to stabilize the flow of chips to obtain good chip dischargeability, and are required to ensure the strength of the cutting edge positioned at a tip end of the rotary tool to improve durability.

Solution to Problem

In order to solve the above problems, a cutting insert according to one aspect of the present disclosure includes a body extending from a first end to a second end along a rotation axis, the body includes a first flank face positioned at a side of the first end, a first flute extending from the first flank face toward the second end, and a first ridge line positioned at an intersection of the first flank face and the first flute, the first ridge line includes a first recessed portion recessed toward the second end, a first inner edge extending from the first recessed portion toward the first end, and a first outer edge extending from the first recessed portion toward an outer periphery of the body. The first flute includes a first recessed groove extending along the first outer edge, and the first recessed groove is connected to the first recessed portion and the first outer edge and is separated from the first inner edge.

Advantageous Effect

According to one aspect of the present disclosure, the flow of chips can be stabilized to obtain good chip dischargeability, and the strength of the cutting edge can be ensured to improve durability.

DESCRIPTION OF EMBODIMENTS

Figure 1:
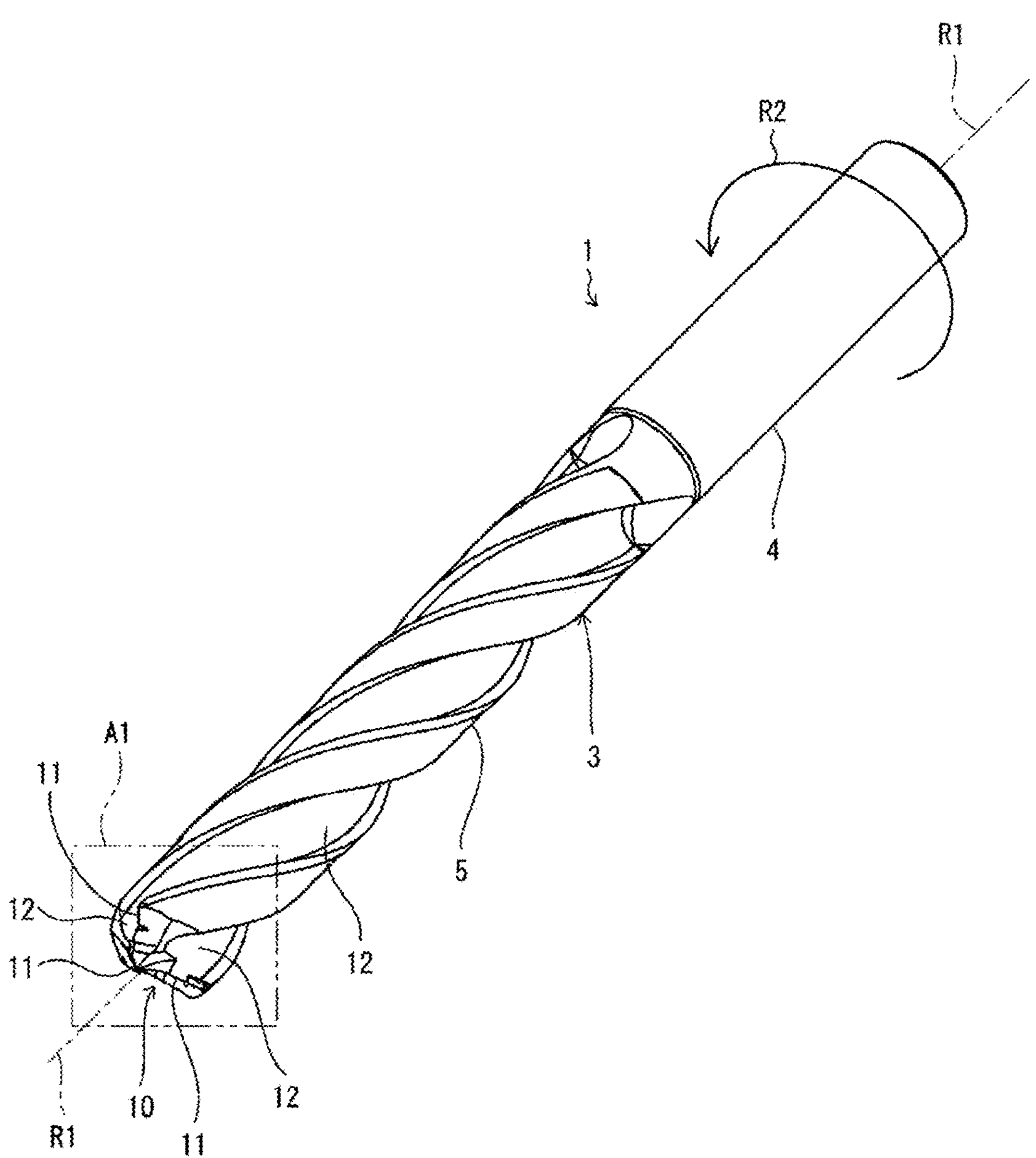
FIG. 1 is a perspective view of a rotary tool according to a first embodiment.

Hereafter, with reference to the accompanying drawings, two types of rotary tools will be described in detail as an example of the present disclosure. However, each of the figures, which will be referred to below, is a simplified representation of only main members necessary for description of the embodiments. Accordingly, the rotary tool may be provided with any constituent member that is not illustrated in each of the drawings, which will be referenced in this specification. The dimensions of the members in the drawings do not faithfully represent the actual dimensions of the constituent members, the dimension ratios of the members, or the like.

First Embodiment

In the present embodiment, a rotary tool that is commonly referred to as a solid tool and that is constituted by using one member is exemplified. Note that a rotary tool that is commonly referred to as a tip exchange type tool and that is constituted by a holder and a cutting insert will be described later in a second embodiment.

1. Rotary Tool

Figure 2:
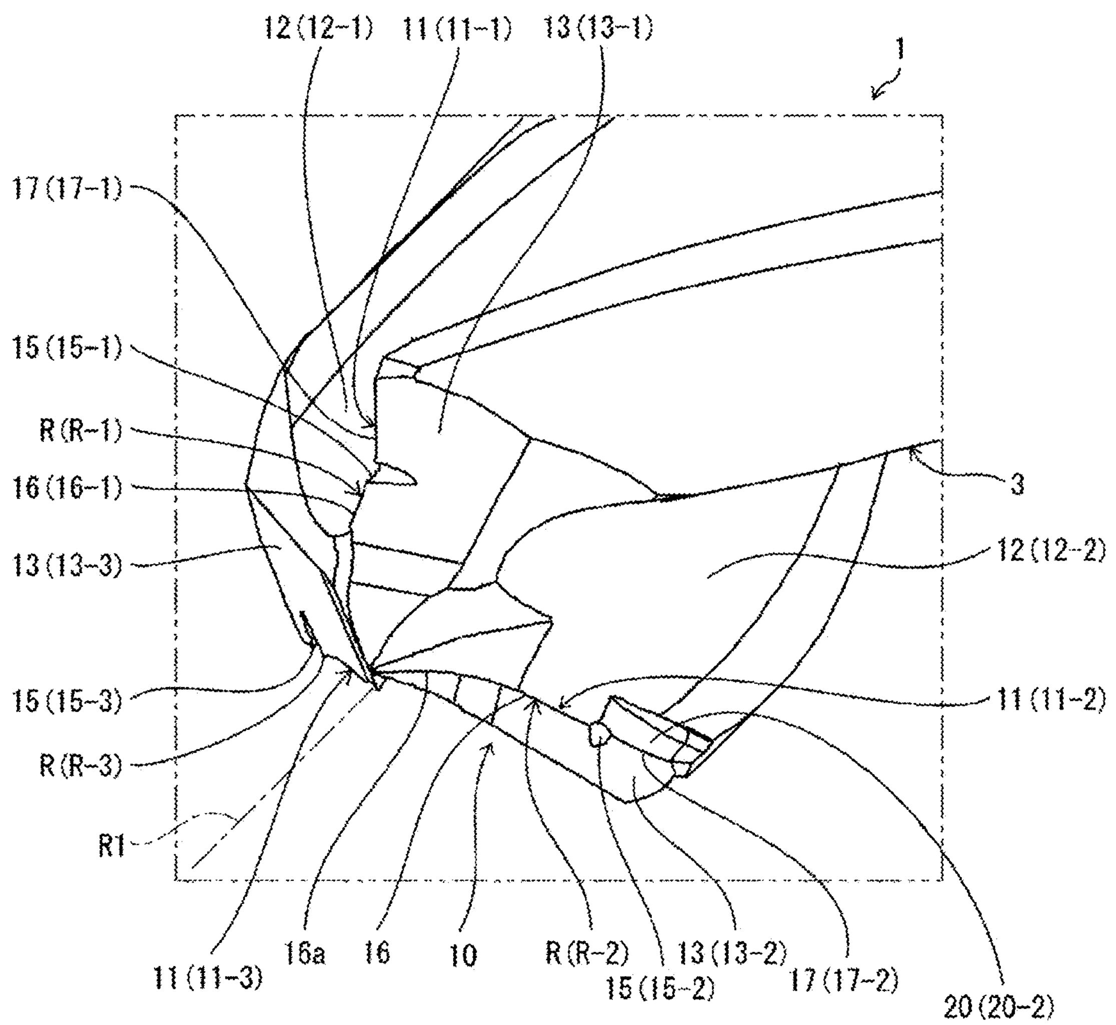
FIG. 2 is an enlarged view of a region A1 illustrated in FIG. 1.
Figure 3:
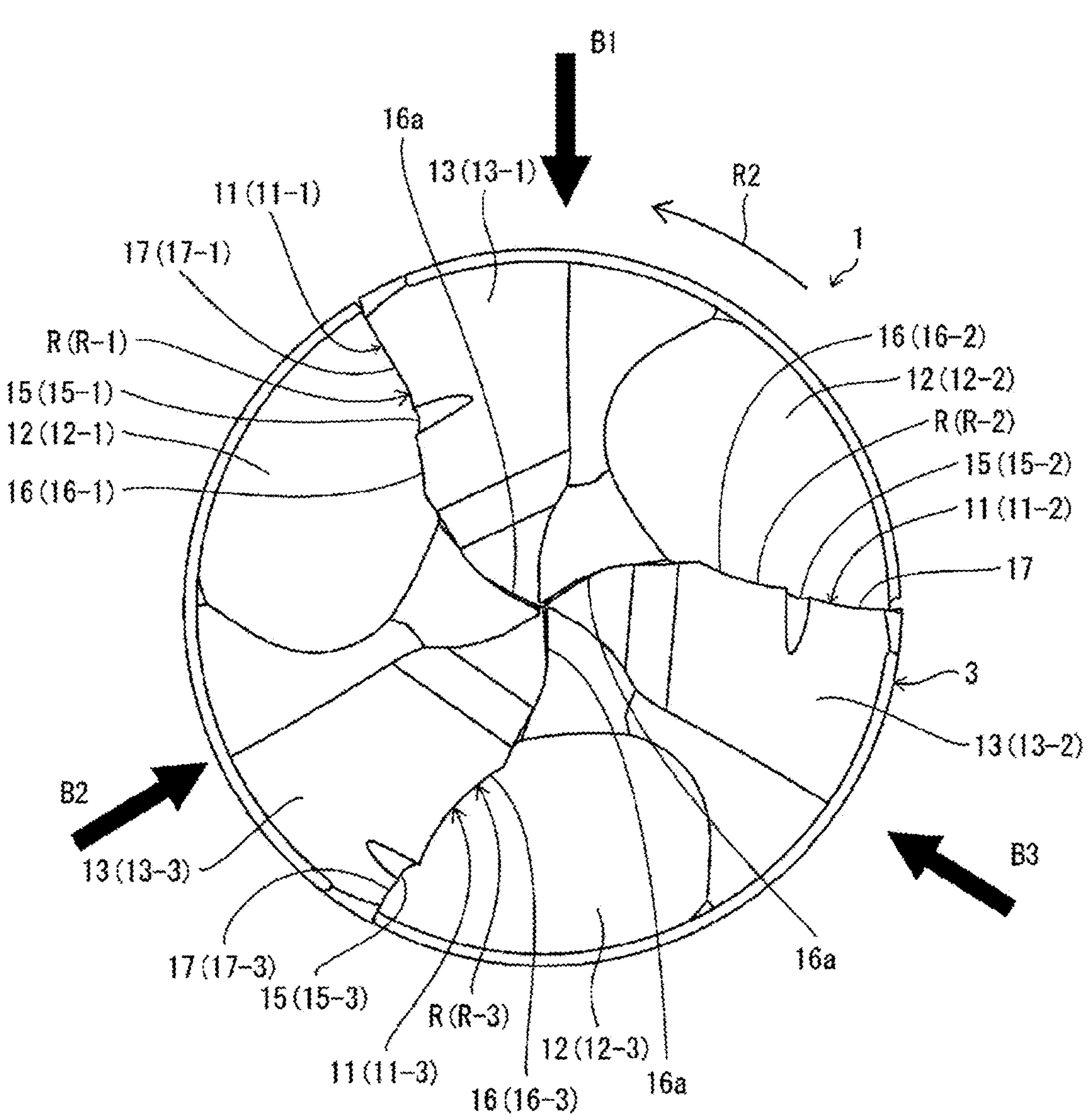
FIG. 3 is a front view of the rotary tool.
Figure 4:
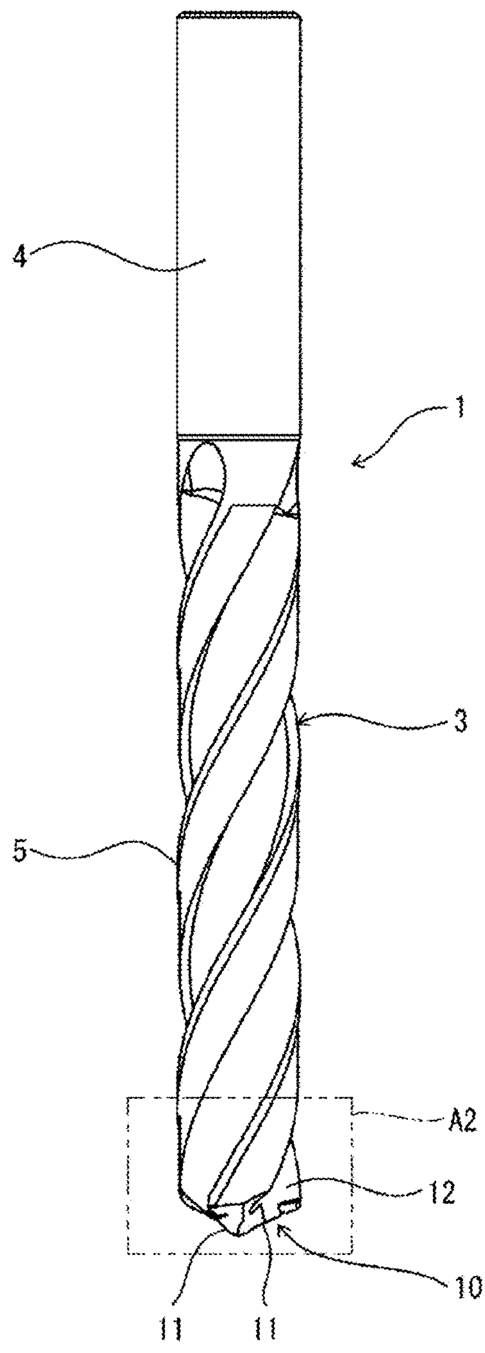
FIG. 4 is a side view of the rotary tool in a view from a B2 direction illustrated in FIG. 3.
Figure 5:
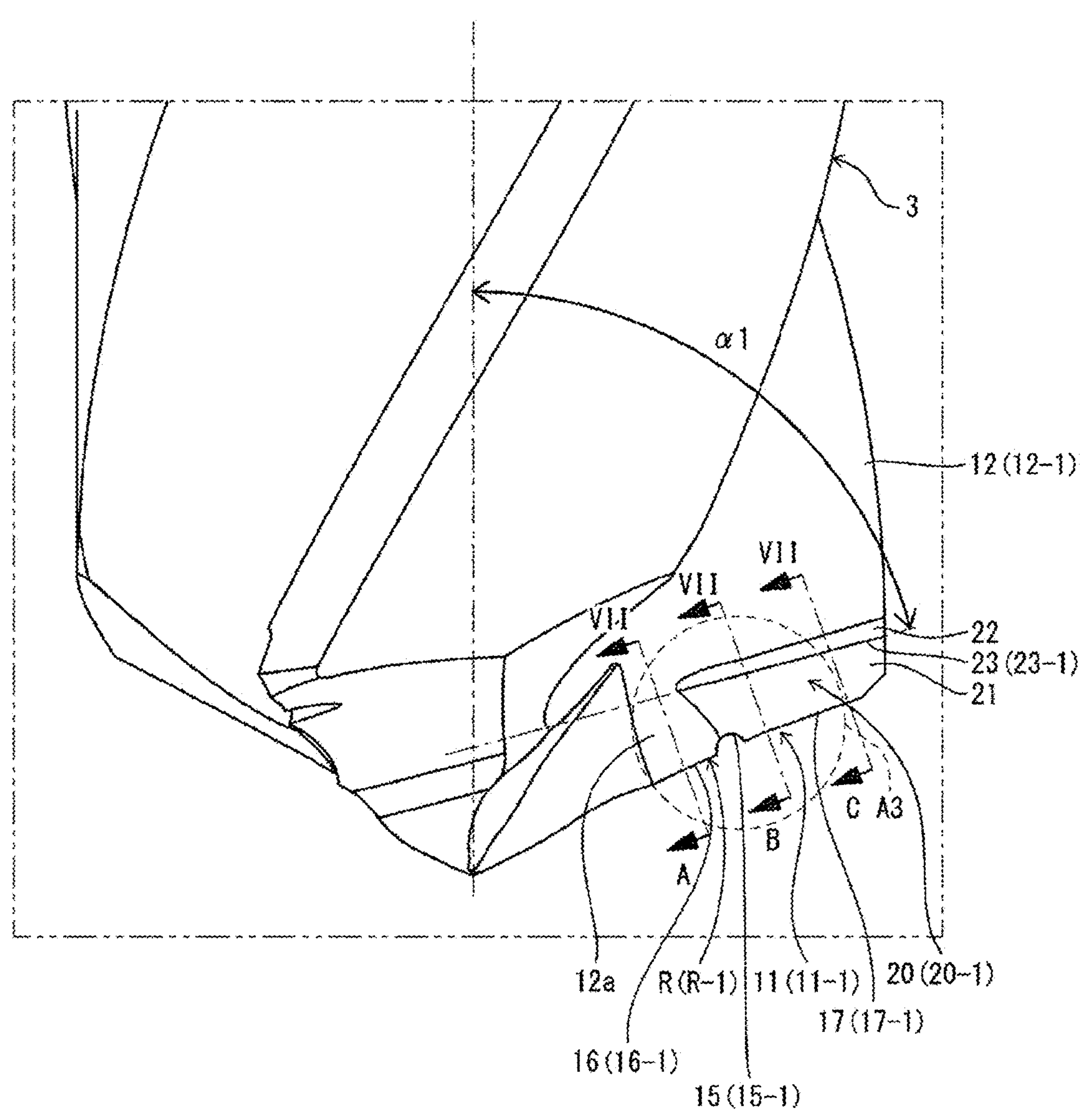
FIG. 5 is an enlarged view of a region A2 illustrated in FIG. 4.
Figure 6:
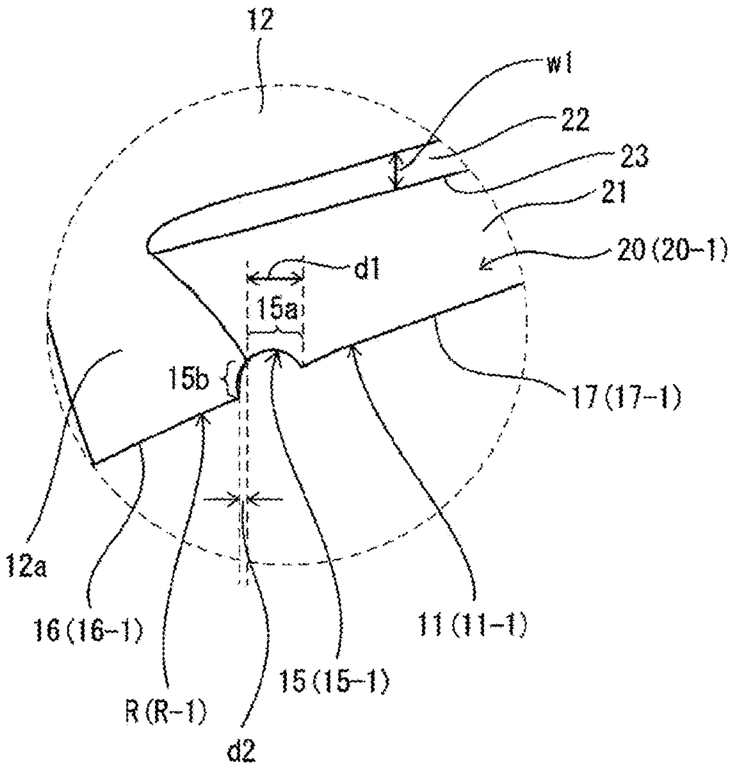
FIG. 6 is an enlarged view of a region A3 illustrated in FIG. 5.
Figure 7:
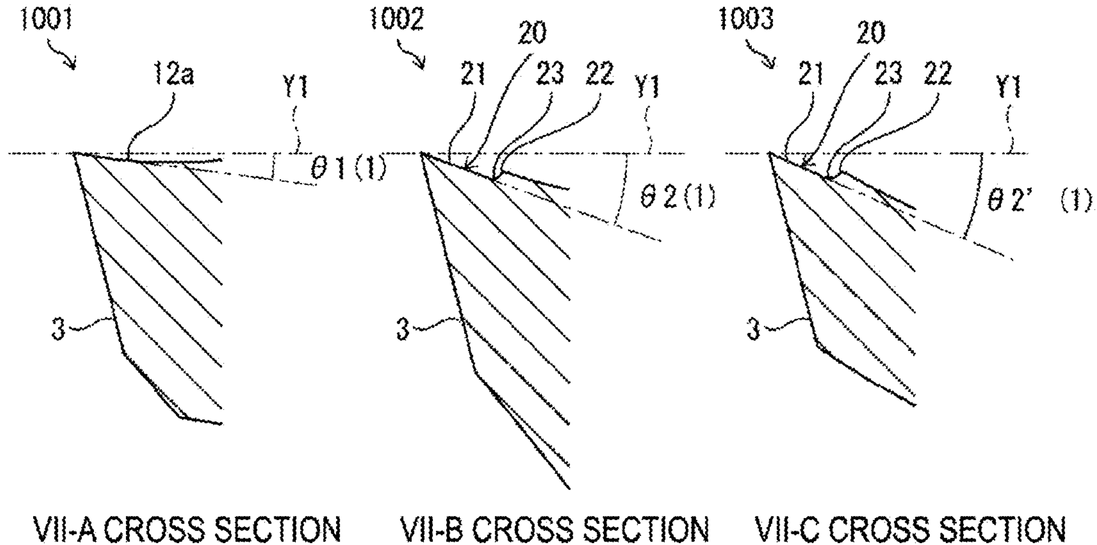
FIG. 7 includes arrow cross-sectional views taken along a VII-A line, a VII-B line, and a VII-C line in FIG. 5.

FIG. 1 is a perspective view of a rotary tool 1 according to the present embodiment. FIG. 2 is an enlarged view of a region A1 illustrated in FIG. 1. FIG. 3 is a front view of the rotary tool 1. FIG. 4 is a side view of the rotary tool 1 in a view from a B2 direction illustrated in FIG. 3. FIG. 5 is an enlarged view of a region A2 illustrated in FIG. 4. FIG. 6 is an enlarged view of a region A3 illustrated in FIG. 5. FIG. 7 includes arrow cross-sectional views taken along a VII-A line, a VII-B line, and a VII-C line in FIG. 5. In FIG. 7, a diagram denoted by the reference sign 1001 is an arrow cross-sectional view taken along the VII-A line, a diagram denoted by the reference sign 1002 is an arrow cross-sectional view taken along the VII-B line, and a diagram denoted by the reference sign 1003 is an arrow cross-sectional view taken along the VII-C line.

As illustrated in FIG. 1 and FIG. 4, a drill can be cited as an example of the rotary tool 1, and the drill is illustrated in the present example. Note that, in addition to the drill, examples of the rotary tool 1 include an end mill.

The rotary tool 1 in this example includes a body 3 having a rod shape and being rotatable around a rotation axis R1, as illustrated in FIG. 1, for example. A cutting portion 10 is formed at one end portion of the body 3. The cutting portion 10 is a portion that comes into contact with a workpiece T to be machined (see FIG. 12) in machining (drilling), which will be described below. The portion has a main function in the machining. When the workpiece T is cut, the rotary tool 1 rotates about the rotation axis R1. Note that an arrow R2 in FIG. 1 and the like indicates a rotation direction of the rotary tool 1.

In the present specification, an end at which the cutting portion 10 is formed is referred to as a tip end (first end) of the body 3, and the other end is referred to as a rear end (second end) of the body 3. The front view in FIG. 3 is a diagram when the rotary tool 1 is seen from a side of the tip end. Viewing the rotary tool 1 from the side of the tip end is expressed as a front view.

The body 3 may include a portion referred to as a shank portion 4 and a portion referred to as a main body 5, as illustrated in FIG. 1. The shank portion 4 is positioned at the side of the rear end of the body 3, and the main body 5 is positioned closer to the tip end of the body 3 than the shank portion 4. The shank portion 4 is a portion that can be gripped by a spindle being rotatable or the like in a machine tool. The cutting portion 10 is provided at a side of a tip end of the main body 5. A flute 12 extending from the cutting portion 10 is formed in a spiral manner on an outer peripheral surface of the main body 5. From the viewpoint of smoothly discharging a chip to the outside, for example, the flute 12 may have a recessed curve shape in a cross section orthogonal to the rotation axis R1.

Cutting Portion

As illustrated in FIG. 2 and FIG. 3, the cutting portion 10 (body 3) includes a ridge line R, a cutting edge 11, the flute 12, and a flank face 13. The flank face 13 is positioned at the side of the tip end of the body 3. The cutting edge 11 is formed in the ridge line R positioned at the intersection of the flank face 13 and the flute 12. The flute 12 is formed to extend from the flank face 13 toward the rear end of the body 3. The flute 12 has a function of discharging a chip generated by cutting with the cutting edge 11. The portion along the cutting edge 11 in the flute 12 is a rake face.

As illustrated in FIG. 2 and FIG. 3, a recessed portion 15 recessed toward the rear end of the body 3 is formed in the ridge line R. The recessed portion 15 is a portion for reducing a width of chips generated at the cutting portion 10, and can suppress an excessive increase in the width of chips. Reducing the width of chips can improve the flow of chips. For example, when the feed rate is relatively small, and the thickness of a chip generated at the cutting edge 11 is thinner than the recessed portion 15, two chips divided by the recessed portion 15 are generated. When the feed rate is relatively large, and the thickness of the chip generated at the cutting edge 11 is thicker than the recessed portion 15, the thickness of the chip generated at the recessed portion 15 becomes relatively thin. Thus, the chip is easily divided with a portion of the chip generated at the recessed portion 15 set as a starting point.

The ridge line R includes such a recessed portion 15. Thus, the cutting edge 11 is divided into an inner edge 16 extending from the recessed portion 15 toward the tip end of the body 3 (the center portion of the body 3) through which the rotation axis R1 passes, and an outer edge 17 extending from the recessed portion 15 toward the outer periphery of the body 3. This means that the ridge line R can be described as including the recessed portion 15, and the inner edge 16 and the outer edge 17. Note that the inner edge 16 may include a chisel edge, and a thinning edge. In the present example, the inner edge 16 includes a thinning edge **16*a* positioned near the tip end of the body 3**.

As illustrated in FIG. 5, the flute 12 includes a recessed groove 20 extending along the outer edge 17. The recessed groove 20 is a part of the rake face, and is recessed from a surface **12*a* of the flute 12. The recessed groove 20 is connected to the recessed portion 15 and the outer edge 17. However, the recessed portion 20 is provided away from the inner edge 16, and is not connected to the inner edge 16**.

Providing the recessed groove 20 away from the inner edge 16 in this manner can stabilize the flow of chips generated at the inner edge 16, thereby improving the fluidity of chips of the rotary tool 1. Note that relatively many chips are easily generated at the outer edge 17 positioned at the outer peripheral side, and thus, a chip generated at the inner edge 16 without providing the recessed groove 20 at the inner edge 16 can be sufficiently discharged. Providing the recessed groove 20 away from the inner edge 16 can secure the thickness of the thinning edge **16*a* of the inner edge 16 and increase strength, thereby improving the durability of the rotary tool 1**.

In contrast, in the drill described in Patent Document 1 described above, a chip breaker groove corresponding to the recessed groove 20 is formed up to a part of the inner peripheral edge of the cutting edge. Thus, the inner peripheral edge includes a portion that is connected to the chip breaker groove, and a portion that is not connected to the chip breaker groove. The flow of chips is significantly different between the portion that is connected to the chip breaker groove and the portion that is not connected to the chip breaker groove, which makes the flow of chips generated at the inner peripheral edge unstable. Patent Document 1 discloses a drill in which the entire inner peripheral edge is connected to the chip breaker groove. However, in such a configuration, the thickness of the entire cutting edge is small, which may reduce the strength of the inner peripheral edge in particular.

As illustrated in FIG. 5, in the present example, the recessed groove 20 includes a first surface 21 extending along the outer edge 17, and a second surface 22 positioned closer to the rear end of the body 3 than the first surface 21. As illustrated in the diagrams denoted by the reference signs 1002 and 1003 in FIG. 7, the second surface 22 is inclined with respect to the first surface 21, and a bottom portion 23 is formed between the first surface 21 and the second surface 22. The second surface 22 is inclined in a direction opposite to a direction in which the recessed groove 20 is recessed with respect to the first surface 21, that is, in a direction of protrusion. As illustrated in FIG. 5, the bottom portion 23 becomes closer to the outer edge 17 as the bottom portion 23 approaches the outer periphery of the body 3.

With such a configuration, when the chip generated at the outer edge 17 curls at the second surface 22, the chip easily moves in a direction away from the outer periphery of the body 3. Thus, there is a small risk of the chip damaging a machined surface of a workpiece (an inner wall of a machined hole).

When the bottom portion 23 becomes closer to the outer edge 17 as the bottom portion 23 approaches the outer periphery of the body 3, a width w1 (see FIG. 6) of the second surface 22 in the direction along the rotation axis R1 may become larger as the second surface 22 approaches the outer periphery of the body 3. That is, the recessed groove 20 becomes closer to the outer edge 17 as the bottom portion 23 approaches the outer periphery of the body 3, and the width w1 of the second surface 22 becomes larger as the second surface 22 approaches the outer periphery of the body 3.

With such a configuration, when the chip generated at the outer edge 17 curls at the second surface 22, the chip moves more easily in a direction away from the outer periphery of the body 3. Thus, there is a small risk of the chip damaging the machined surface of a workpiece.

In the present example, as illustrated in the diagrams denoted by reference signs 1001 and 1002 in FIG. 7, when a rake angle of an inner edge 16 is defined as an inner rake angle θ1, and a rake angle of an outer edge 17 is defined as an outer rake angle θ2, the outer rake angle θ2 is larger than the inner rake angle θ1. The same and/or a similar applies to an outer rake angle θ2' illustrated in the diagram denoted by the reference sign 1003 in FIG. 7, and the outer rake angle θ2' is larger than the inner rake angle θ1.

Here, the rake angle in the present example can be defined in a cross section orthogonal to a portion of the cutting edge 11 of interest in a front view. For example, in the cross sections illustrated in the diagrams denoted by the reference signs 1001 to 1003 in FIG. 7, the rake angle can be defined as an angle formed between an imaginary straight line Y1 parallel to the rotation axis R1 and a portion of the flute 12 being along the cutting edge 11. That is, the angle θ1 formed between the imaginary straight line Y1 and the portion of the flute 12 along the inner edge 16, as denoted by the reference sign 1001 in FIG. 7, is an inner rake angle. The angles θ2 and 02' formed between the imaginary straight line Y1 and the portion of the flute 12 along the outer edge 17, as denoted by the reference signs 1002 and 1003 in FIG. 7, are outer rake angles. Note that each of the VII-A line, the VII-B line, and the VII-C line in FIG. 5 is orthogonal to the cutting edge 11. In other words, FIG. 7 illustrates cross sections orthogonal to the cutting edge 11. In the diagrams denoted by the reference signs 1001 to 1003 in FIG. 7, for convenience, the height positions of the imaginary straight lines Y1 are aligned.

When the portion of the flute 12 along the cutting edge 11 is positioned forward of the cutting edge 11 in a rotation direction R2 (see FIG. 1 and FIG. 3), the rake angle has a negative value. When the portion of the flute 12 along the cutting edge 11 is positioned backward of the cutting edge 11 in the rotation direction R2, the rake angle has a positive value.

As illustrated in the diagrams denoted by the reference signs 1001 to 1003 in FIG. 7, in the present example, all of the inner rake angle θ1 and the outer rake angles θ2 and θ2' are positive values. Note that the cross section illustrated in the diagram denoted by the reference sign 1001 in FIG. 7 is a portion closer to the outer edge 17, and thus, the inner rake angle θ1 has a positive value, but the rake angle has a negative value at a portion of a chisel edge positioned at the tip end of the body 3, for example.

In this way, the outer rake angle θ2 (the outer rake angle θ2') is larger than the inner rake angle θ1, and thus, the durability of the cutting edge 11 is increased while the surface accuracy of the machined surface is increased. The cutting speed of the inner edge 16 is slow compared with the outer edge 17. Thus, a relatively large cutting load is easily applied to the inner edge 16. However, when the inner rake angle θ1 is smaller than the outer rake angles θ2 and θ2', the thickness of a portion where the inner edge 16 is positioned in the cutting portion 10 is ensured to be thick, which makes the durability high.

The outer edge 17 is positioned away from the rotation axis R1 compared with the inner edge 16. Here, when the outer rake angles θ2 and θ2' are larger than the inner rake angle θ1, the sharpnesses of the outer rake angles θ2 and θ2' are high. Thus, chatter vibration is easily suppressed, and the surface accuracy of the machined surface is increased. As a result, the durability of the cutting edge 11 is increased, and the surface accuracy of the machined surface is high.

When the outer rake angle θ2 is larger than the inner rake angle θ1, the outer rake angle θ2 may become larger toward the outer periphery of the body 3. In the present example, as illustrated in the diagrams denoted by the reference signs 1002 and 1003 in FIG. 7, the outer rake angle θ2' near the outer periphery of the body 3 is larger than the outer rake angle Θ.

With such a configuration, the outer edge 17 has higher durability as a portion thereof is closer to the rotation axis R1, and has higher sharpness as a portion thereof is farther from the rotation axis R1. Thus, the durability of the cutting edge 11 is further enhanced, and the surface accuracy of the machined surface is higher.

In the present example, as illustrated in FIG. 6, the recessed portion 15 includes a first portion 15*a* connected to the recessed groove 20, and a second portion 15*b* separated from the recessed groove 20. When a length of the first portion 15*a* in a direction orthogonal to the rotation axis R1 is defined as a distance d1, and a length of the second portion 15*b* in a direction orthogonal to the rotation axis R1 is defined as a distance d2, the first portion 15*a* is longer than the second portion 15*b*. That is, a relationship of d1>d2 holds.

With such a configuration, a chip generated at the outer edge 17 easily contacts the recessed groove 20, and the chip can be stably curved at the recessed groove 20.

Configuration Including Plurality of Cutting Edges

As illustrated in FIG. 3, in the present example, the cutting portion 10 is formed with three cutting edges (a first cutting edge 11-1, a second cutting edge 11-2, and a third cutting edge 11-3) as the cutting edge 11 described above, and is also formed with three flutes (a first flute 12-1, a second flute 12-2, and a third flute 12-3) corresponding to the three cutting edges 11 as the flute 12. When a plurality of cutting edges 11 are formed in this manner, the plurality of cutting edges 11 are preferably positioned so as to be rotationally symmetric with respect to the rotation axis R1. In the present example, the three cutting edges 11 are formed with a rotationally symmetric shape of 120° with reference to the rotation axis R1 when the rotary tool 1 is seen in a front view. Note that each of the shapes of the cutting edges 11 may be a linear shape, or may be a curved shape, in a front view.

When the plurality of cutting edges 11 are formed in this manner, as illustrated in FIG. 3, the positions of the recessed portions 15 of the cutting edges 11 are preferably disposed so as to be shifted from each other in a radial direction. When the positions of the recessed portions 15 are shifted from each other in the radial direction, the forming positions of the recessed grooves 20 determined by the positions of the recessed portions 15 are different from each other.

Hereinafter, the cutting edge 11 including the recessed portion 15 at the position closest to the tip end of the body 3 (the center of the body 3) through which the rotation axis R1 passes is referred to as the first cutting edge 11-1. The cutting edge 11 including the recessed portion 15 at the position closest to the outer periphery of the body 3 is referred to as the third cutting edge 11-3. The cutting edge 11 including the recessed portion 15 between the position of the recessed portion 15 of the first cutting edge 11-1 and the position of the recessed portion 15 of the third cutting edge 11-3 is referred to as the second cutting edge 11-2. In FIG. 3, the first cutting edge 11-1 to the third cutting edge 11-3 are aligned in a direction opposite to the rotation direction indicated by an arrow R2.

Hereinafter, as necessary, the recessed portions 15 provided at the first cutting edge 11-1 to the third cutting edge 11-3 are referred to as the first recessed portion 15-1 to the third recessed portion 15-3, and the recessed grooves 20 corresponding to the first cutting edge 11-1 to the third cutting edge 11-3 are referred to as a first recessed groove 20-1 to a third recessed groove 20-3. The same and/or a similar applies to the flute 12, the flank face 13, the ridge line R, and the like. That is, constituent elements corresponding to the first cutting edge 11-1 have "−1" added after the reference sign, and constituent elements corresponding to the second cutting edge 11-2 have "−2", and constituent elements corresponding to the third cutting edge 11-3 have "−3". For example, a flank face corresponding to the first cutting edge 11-1 is a first flank face 13-1, a flank face corresponding to the second cutting edge 11-2 is a second flank face 13-2, and a flank face corresponding to the third cutting edge 11-3 is a third flank face 13-3.

In other words, in the configuration described above, the second recessed portion 15-2 formed at the second cutting edge 11-2 is positioned closer to the outer periphery of the body 3 than the first recessed portion 15-1 formed at the first cutting edge 11-1.

With such a configuration, the second cutting edge 11-2 positioned at the downstream side in the rotation direction R2 covers the cutting remainder generated at the recessed portion 15 of the first cutting edge 11-1. Similarly, the cutting remainder generated at the recessed portion 15 of the second cutting edge 11-2 covers the third cutting edge 11-3 positioned on the downstream side in the rotation direction R2. This makes it possible to eliminate the cutting remainder due to the recessed portion 15 being provided.

Figure 8:
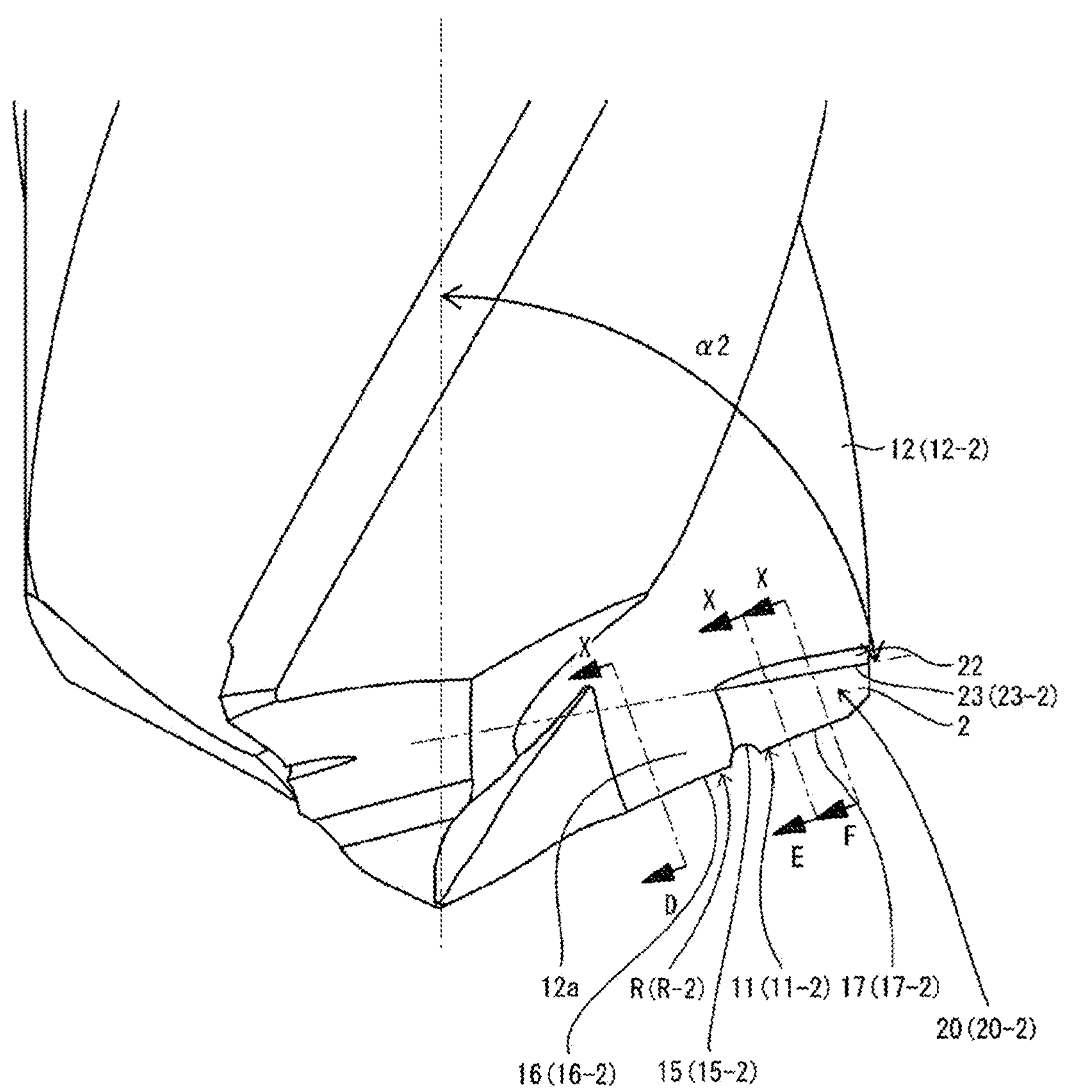
FIG. 8 is an enlarged view of a tip end portion of a side surface of the rotary tool in a view from a B1 direction illustrated in FIG. 3.
Figure 9:
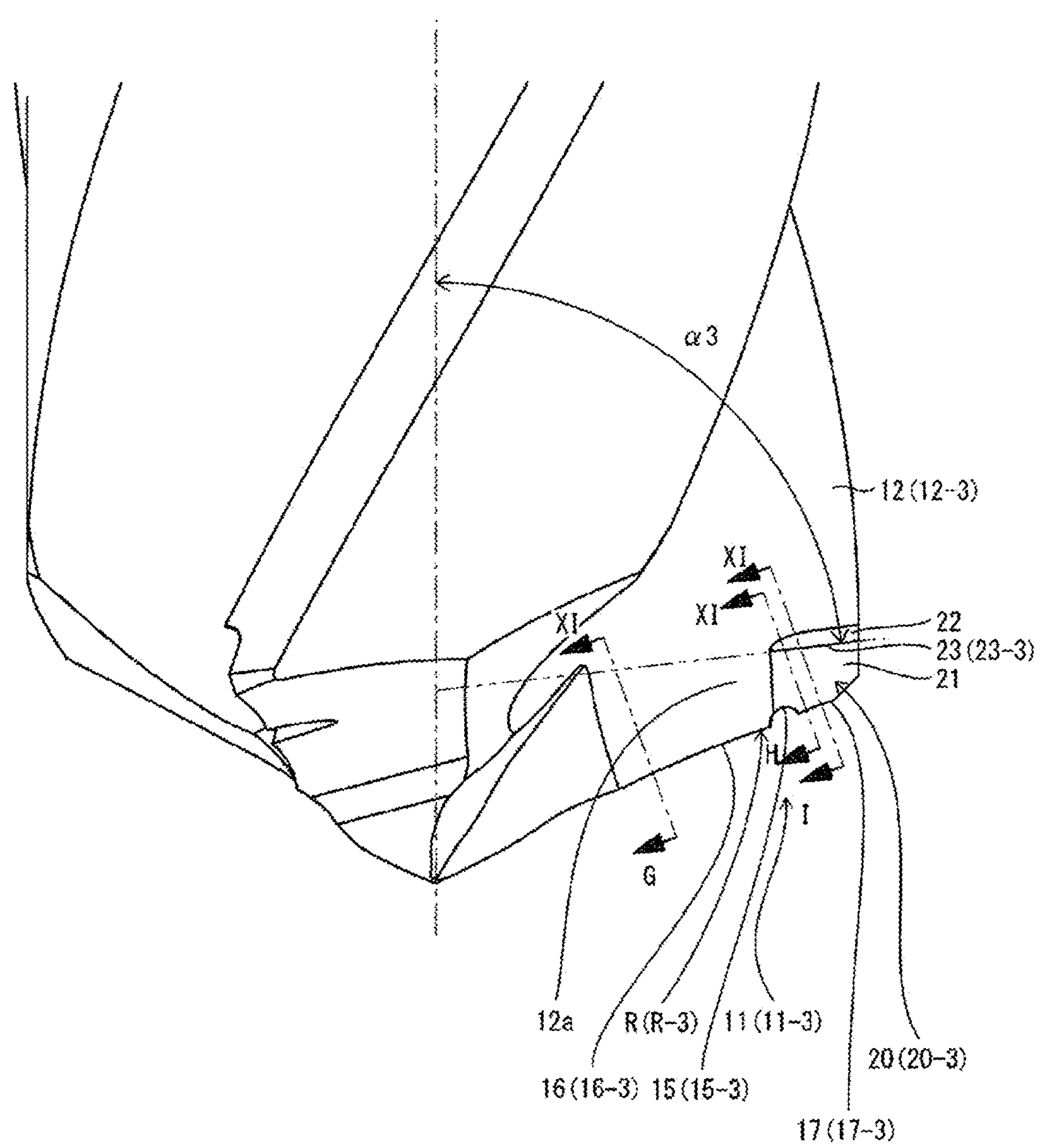
FIG. 9 is an enlarged view of a tip end portion of a side surface of the rotary tool in a view from a B3 direction illustrated in FIG. 3.
Figure 10:
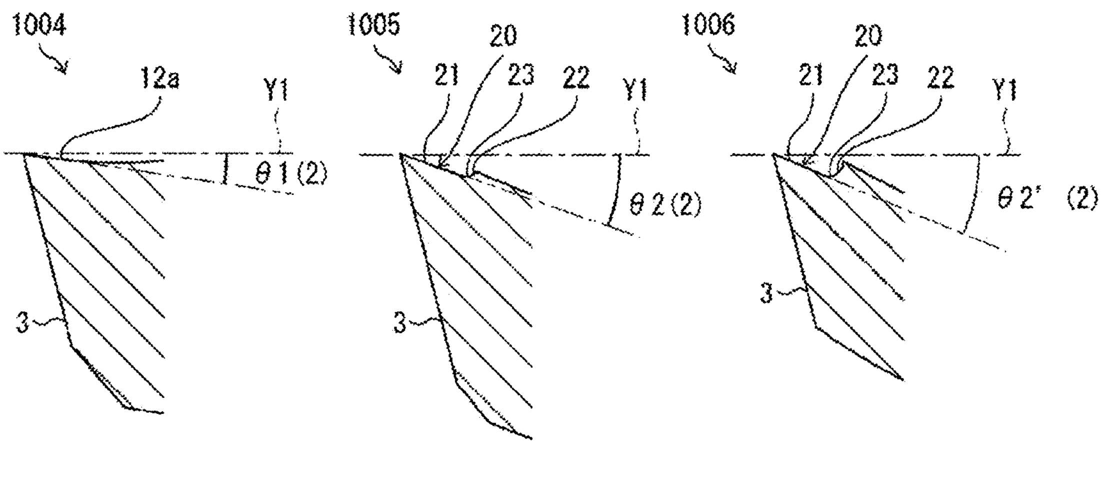
FIG. 10 includes arrow cross-sectional views taken along an X-D line, an X-E line, and an X-F line in FIG. 8.
Figure 11:
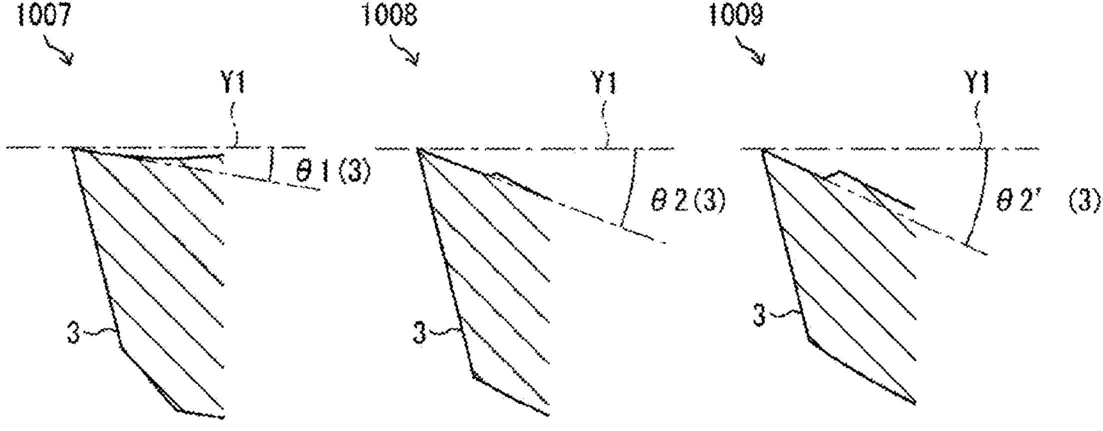
FIG. 11 includes arrow cross-sectional views taken along an XI-G line, an XI-H line, and an XI-I line in FIG. 9.

With reference to FIG. 8 to FIG. 11, in a configuration in which a plurality of cutting edges 11 are provided, a preferable shape and the like of the recessed grooves 20 will be described. FIG. 8 is an enlarged view of a tip end portion of the side surface of the rotary tool 1 in a view from a B1 direction illustrated in FIG. 3. FIG. 9 is an enlarged view of the tip end portion of the side surface of the rotary tool 1 in a view from a B3 direction illustrated in FIG. 3. FIG. 10 includes arrow cross-sectional views taken along an X-D line, an X-E line, and an X-F line in FIG. 8. In FIG. 10, a diagram denoted by the reference sign 1004 is an arrow cross-sectional view taken along the X-D line, a diagram denoted by the reference sign 1005 is an arrow cross-sectional view taken along the X-E line, and a diagram denoted by the reference sign 1006 is an arrow cross-sectional view taken along the X-F line. Note that each of the X-D line, the X-E line, and the X-F line in FIG. 8 is orthogonal to the cutting edge 11. FIG. 11 includes arrow cross-sectional views taken along an XI-G line, an XI-H line, and an XI-I line in FIG. 9. In FIG. 11, a diagram denoted by the reference sign 1007 is an arrow cross-sectional view taken along the XI-G line, a diagram denoted by the reference sign 1008 is an arrow cross-sectional view taken along the XI-H line, and a diagram denoted by the reference sign 1009 is an arrow cross-sectional view taken along the XI-I line. Note that each of the XI-G line, the XI-H line, and the XI-I line is orthogonal to the cutting edge 11.

As illustrated in FIG. 5, FIG. 8, and FIG. 9, positions of the first recessed portion 15-1 to the third recessed portion 15-3 are shifted in the radial direction. More specifically, as described above, the first recessed portion 15-1 is positioned closest to the tip end of the body 3 (the center of the body 3), the second recessed portion 15-2 is positioned closer to the outer periphery of the body 3 than the first recessed portion 15-1, and the third recessed portion 15-3 is positioned closer to the outer periphery of the body 3 than the second recessed portion 15-2. Due to the differences in positions at which the first recessed portion 15-1 to the third recessed portion 15-3 are formed, the forming positions and sizes of the first recessed groove 20-1 to the third recessed groove 20-3 are different from each other.

In the present example, a first bottom portion 23-1 to a third bottom portion 23-3 of the first recessed groove 20-1 to the third recessed groove 20-3 have a linear shape. An angle formed by the rotation axis R1 and the bottom portion 23 in a side view of the rotary tool 1 is referred to as an inclination angle. That is, the inclination angle of the first bottom portion 23-1 illustrated in FIG. 5 is defined as a first inclination angle $\alpha$1, the inclination angle of the second bottom portion 23-2 illustrated in FIG. 8 is defined as a second inclination angle $\alpha$2, and the inclination angle of the third bottom portion 23-3 illustrated in FIG. 9 is defined as a third inclination angle $\alpha$3. In the present example, these three inclination angles are configured such that the second inclination angle $\alpha$2 is larger than the first inclination angle $\alpha$1, and the third inclination angle $\alpha$3 is larger than the second inclination angle $\alpha$2.

The first recessed portion 15-1 is closer to the center of the body 3 compared than is the second recessed portion 15-2, so that a first outer edge 17-1 is longer than a second outer edge 17-2. Thus, the width of a chip generated at the first outer edge 17-1 is larger than the width of a chip generated at the second outer edge 17-2. That is, the chip generated at the first outer edge 17-1 is larger and heavier than the chip generated at the second outer edge 17-2. As a result, when the chip generated at the first outer edge 17-1 comes into contact with a machined surface of a workpiece, compared with the chip generated at the second outer edge 17-2, the machined surface may be greatly scratched.

However, when the second inclination angle $\alpha$2 is larger than the first inclination angle $\alpha$1, in other words, when the first inclination angle $\alpha$1 is smaller than the second inclination angle $\alpha$2, the chip generated at the first outer edge 17-1 easily moves in a direction away from the outer periphery of the body 3.

On the other hand, the width of a chip generated at the second outer edge 17-2 is smaller than the width of a chip generated at the first outer edge 17-1. Thus, the movement direction of the chip generated at the second outer edge 17-2 is likely to be unstable. Here, when the second inclination angle $\alpha$2 is larger than the first inclination angle $\alpha$1, an angle formed by the second outer edge 17-2 and the second bottom portion 23-2 in a side view is likely to be larger than an angle formed by the first outer edge 17-1 and the first bottom portion 23-1 in a side view. Thus, the chip generated at the second outer edge 17-2 is easily curled at the second recessed groove 20-2 in a stable manner.

Similarly, the second recessed portion 15-12 is closer to the center of the body 3 than is the third recessed portion 15-3. Thus, the second outer edge 17-2 is longer than a third outer edge 17-3. Accordingly, the width of a chip generated at the second outer edge 17-2 is larger than the width of a chip generated at the third outer edge 17-3. That is, the chip generated at the second outer edge 17-2 is larger and heavier than the chip generated at the third outer edge 17-3. As a result, when the chip generated at the second outer edge 17-2 comes into contact with the machined surface of the workpiece, compared with the chip generated at the third outer edge 17-3, the machined surface may be greatly scratched.

However, when the third inclination angle $\alpha$3 is larger than the second inclination angle $\alpha$2, in other words, when the second inclination angle 2 is smaller than the third inclination angle $\alpha$3, the chip generated at the second outer edge 17-2 easily moves in a direction away from the outer periphery of the body 3.

On the other hand, the width of a chip generated at the third outer edge 17-3 is smaller than the width of a chip generated at the second outer edge 17-2. Thus, the movement direction of the chip generated at the third outer edge 17-3 is likely to be unstable. Here, when the third inclination angle $\alpha$3 is larger than the second inclination angle $\alpha$2, the angle formed by the third outer edge 17-3 and the third bottom portion 23-3 in a side view is likely to be larger than the angle formed by the second outer edge 17-2 and the second bottom portion 23-2 in a side view. Thus, the chip generated at the third outer edge 17-3 is easily curled at the third recessed groove 20-3 in a stable manner.

Note that, in order to distinguish between the first surface 21 of the first recessed groove 20-1 and the first surface 21 of the second recessed groove 20-2, the first surface 21 of the second recessed groove 20-2 may be referred to as a third surface. Similarly, in order to distinguish between the second surface 22 of the first recessed groove 20-1 and the second surface 22 of the second recessed groove 20-2, the second surface 22 of the second recessed groove 20-2 may be referred to as a fourth surface.

In the present example, rake angles corresponding to the first cutting edge 11-1 to the third cutting edge 11-3 satisfy the following relationships. The rake angle of the first outer edge 17-1 (see FIG. 5) of the first cutting edge 11-1 illustrated in the diagram denoted by the reference sign 1002 in FIG. 7 is defined as a first outer rake angle $\theta$2(1). The rake angle of the second outer edge 17-2 (see FIG. 8) of the second cutting edge 11-2 illustrated in the diagram denoted by the reference sign 1005 in FIG. 10 is defined as a second outer rake angle $\theta$2(2). The rake angle of the third outer edge 17-3 (see FIG. 9) of the third cutting edge 11-3 illustrated in the diagram denoted by the reference sign 1008 in FIG. 11 is defined as a third outer rake angle $\theta$2(3).

The rake angle of a first inner edge 16-1 (see FIG. 5) of the first cutting edge 11-1 illustrated in the diagram denoted by the reference sign 1001 in FIG. 7 is defined as a first inner rake angle $\theta$1(1). The rake angle of a second inner edge 16-2 (see FIG. 8) of the second cutting edge 11-2 illustrated in the diagram denoted by the reference sign 1004 in FIG. 10 is defined as a second inner rake angle $\theta$1(2). The rake angle of a third inner edge 16-3 (see FIG. 9) of the third cutting edge 11-3 illustrated in the diagram denoted by the reference sign 1007 in FIG. 11 is defined as a third inner rake angle $\theta$1(3).

In the present example, the body 3 has a configuration in which the second outer rake angle $\theta$2(2) is larger than the first outer rake angle $\theta$2(1). Similarly, as a more preferred configuration, the body 3 has a configuration in which the third outer rake angle $\theta$2(3) is larger than the second outer rake angle $\theta$2(2). Note that $\theta2(1)<\theta2(2)=\theta2(3)$ may be established as a configuration of the body 3 in which the second outer rake angle $\theta$2(2) is larger than the first outer rake angle $\theta$2(1). $\theta2(1)=\theta2(2)<\theta2(3)$ may be established as a configuration of the body 3 in which the third outer rake angle $\theta$2(3) is larger than the second outer rake angle $\theta$2(2).

As described above, the width of the chip generated at the second outer edge 17-2 is smaller than the width of the chip generated at the first outer edge 17-1. Accordingly, the movement direction of the chip generated at the second outer edge 17-2 is likely to be relatively unstable. However, when the second outer rake angle $\theta$2(2) is larger than the first outer rake angle $\theta$2(1), a chip generated at the second outer edge 17-2 is easily bent in a stable manner. Thus, chip dischargeability is improved.

Similarly, the width of a chip generated at the third outer edge 17-3 is smaller than the width of a chip generated at the second outer edge 17-2. Thus, the movement direction of the chip generated at the third outer edge 17-3 is likely to be relatively unstable. However, when the third outer rake angle $\theta$2(3) is larger than the second outer rake angle $\theta$2(2), a chip generated at the third outer edge 17-3 is easily bent in a stable manner. Thus, chip dischargeability is improved.

In this case, the first inner rake angle $\theta$1(1), the second inner rake angle $\theta$1(2), and the third inner rake angle $\theta$1(3) may be identical to each other.

As described above, the cutting speed of the inner edge 16 is slow compared with that of the outer edge 17. Accordingly, a relatively large cutting load is easily applied to the inner edge 16. When the first inner rake angle $\theta$1(1), the second inner rake angle $\theta$1(2), and the third inner rake angle $\theta$1(3) are identical to each other, variations in cutting load applied to the first inner edge 16-1, the second inner edge 16-2, and the third inner edge 16-3 are small. In this way, variations in cutting loads are small at positions to which relatively large cutting loads are easily applied. Thus, the durability of the pointed tip end is high. In this manner, the variations in cutting loads at the positions to which the relatively large cutting loads are easily applied are small. Thus, shaking hardly occurs when the rotary tool 1 is engaged with a workpiece.

However, the conditions that the first inner rake angle $\theta$1(1), the second inner rake angle $\theta$1(2), and the third inner rake angle $\theta$1(3) are identical to each other do not require that these angles be strictly identical. These angles may have slight variations of approximately ±3°. Note that when the variations in these angles are equal to or smaller than ±1°, the above-described variations in cutting loads are further smaller.

2. Method for Manufacturing Machined Product

Figure 12:
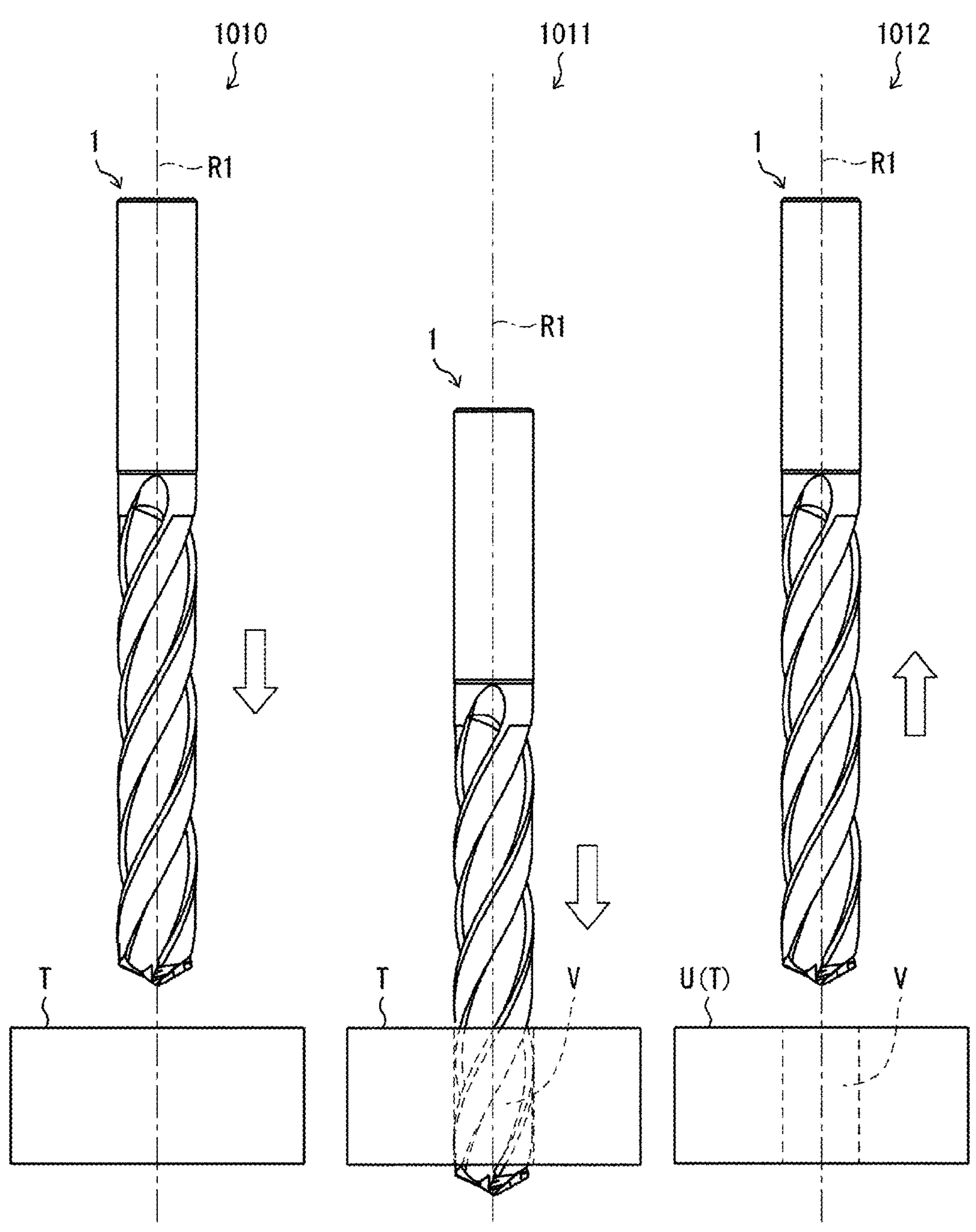
FIG. 12 is a schematic view illustrating a process of a method for manufacturing a machined product according to an embodiment.

A method for manufacturing a machined product as an example will be described by using FIG. 12. FIG. 12 is a schematic view illustrating a process of a method for manufacturing a machined product according to an embodiment. Hereafter, a method for manufacturing a machined product U by cutting the workpiece T by using the rotary tool 1 will be described.

The method for manufacturing the machined product U according to the embodiment may include the following steps. Specifically, (1) rotating the rotary tool 1, (2) bringing the rotary tool 1 into contact with the workpiece T, and (3) separating the rotary tool 1 from the workpiece T may be included.

More specifically, first, as illustrated in the diagram denoted by the reference sign 1010 in FIG. 12, the workpiece T is prepared directly below the rotary tool 1, and the rotary tool 1 attached to a machine tool is rotated about the rotation axis R1. Typical examples of the material of the workpiece T include aluminum, carbon steel, alloy steel, stainless steel, cast iron, and non-ferrous metal.

As illustrated in the diagram denoted by the reference sign 1011 in FIG. 12, the rotary tool 1 and the workpiece T are brought into proximity. Then, the rotary tool 1 is brought into contact with the workpiece T. Thus, the workpiece T is cut by the cutting edge 11, and a machined hole V is formed. A chip of the cut workpiece T is discharged outside through the flute 12. The rotary tool 1 and the workpiece T only need to be relatively close to each other, and the method is not particularly limited. For example, the rotary tool 1 may be moved toward the fixed workpiece T, or the workpiece T may be moved with respect to the fixed rotary tool 1.

The rotary tool 1 is then separated from the workpiece T, as illustrated in the diagram denoted by the reference sign 1012 in FIG. 12. In this way, the machined product U, which is the workpiece T in which the machined hole V is formed, is produced.

Second Embodiment

Another embodiment of the present invention will be described below. Note that, for convenience of description, a member having the same function as that of a member described in the embodiment described above is denoted by the same reference sign, and description thereof will not be repeated.

Figure 13:
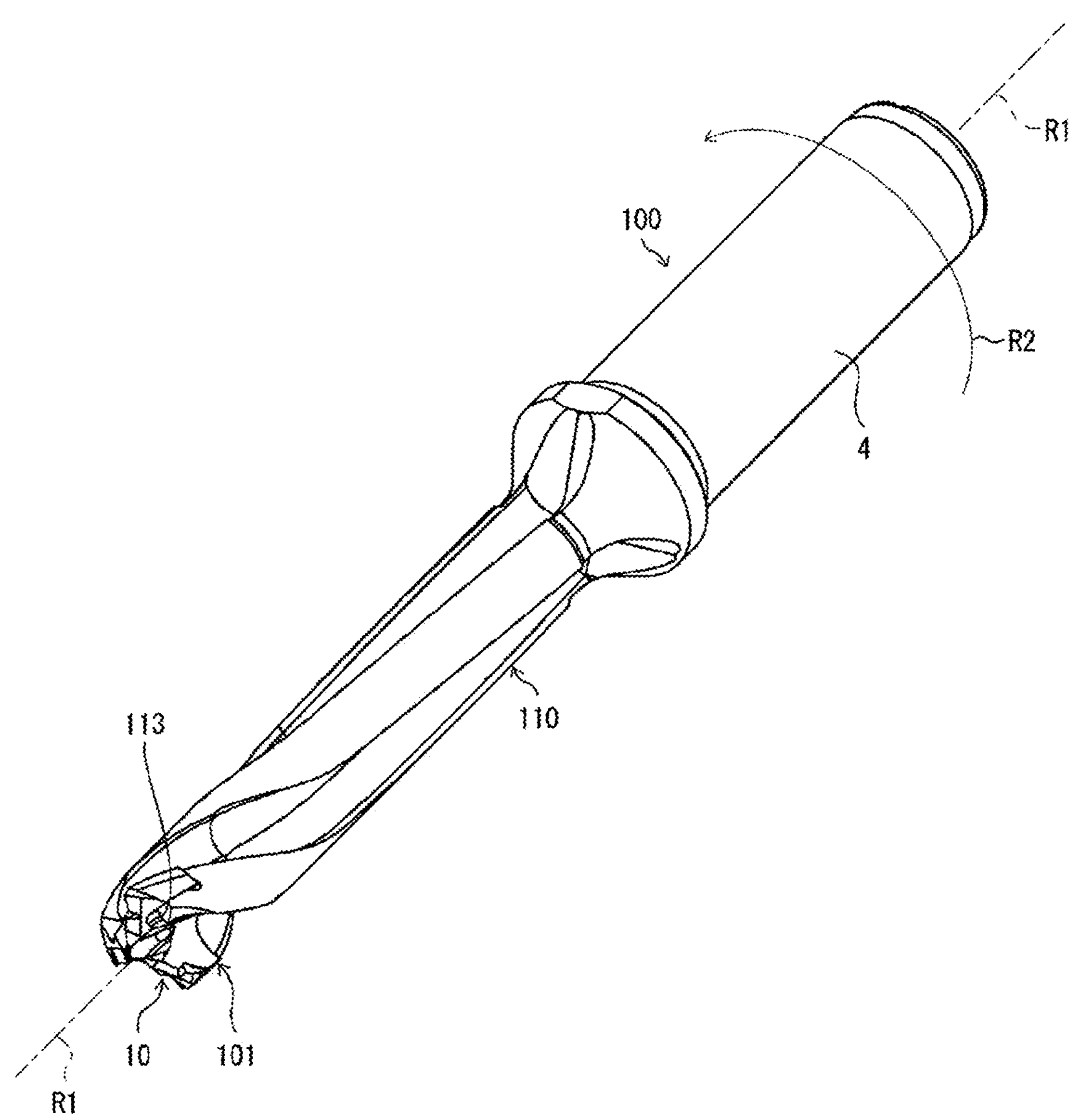
FIG. 13 is a perspective view illustrating a rotary tool according to a second embodiment.
Figure 14:
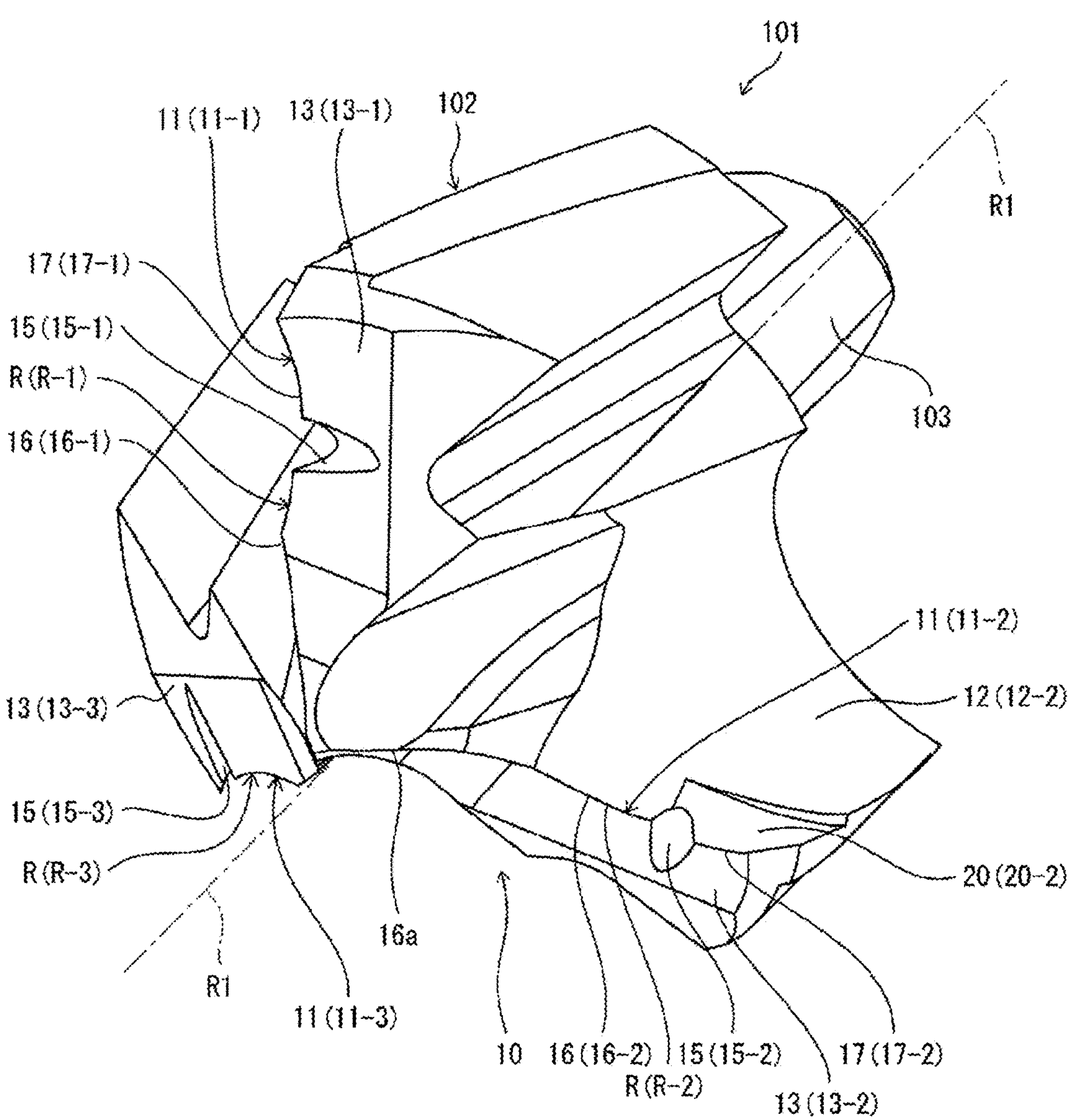
FIG. 14 is a perspective view of an insert of the rotary tool illustrated in FIG. 13.

In the present embodiment, a rotary tool that is generally referred to as a tip exchange type tool and that is constituted by a holder and a cutting insert (hereinafter, also referred to simply as an insert) will be described. FIG. 13 is a perspective view of a rotary tool 100 according to the present embodiment. FIG. 14 is a perspective view of an insert 101 in the rotary tool 100 illustrated in FIG. 13.

As illustrated in FIG. 13, in the rotary tool 100 in the present example, the insert 101 and a holder 110 are formed as separated bodies, and the insert 101 is attached to a tip end portion of the holder 110. The rotary tool 100 in the present example is a single-chip type drill to which one insert 101 is attached, but the rotary tool provided with the insert 101 is not limited to the single-chip type drill.

The insert 101 in the present example includes a main body (body) 102 extending from a tip end to a rear end, and the cutting portion 10 is formed at a side of the tip end of the main body 102. A shaft 103 extending along the rotation axis R1 is provided at a side of the rear end of the main body 102.

The holder 110 extends along the rotation axis R1, and the shaft 103 of the insert 101 is fitted at a side of the tip end of the holder 110. A pocket 113 to be engaged with the shaft 103 is provided at the side of the tip end of the holder 110.

Examples of a material of the insert 101 include, for example, inorganic materials such as a cemented carbide alloy, cermet, and ceramics. Examples of the composition of the cemented carbide alloy include WC (tungsten carbide)-Co, WC-TiC (titanium carbide)-Co and WC-TiC-TaC (tantalum carbide)-Co.

Here, WC, TiC and TaC are hard particles, and Co is a binder phase. Cermet is a sintered composite material in which a metal is combined with a ceramic component. Specific examples of the cermet include a compound mainly composed of TiC or TiN (titanium nitride). It goes without saying that the material of the insert 101 is not limited to these materials.

Although not particularly illustrated, the insert 101 may have a configuration including a base containing the material described above and a coating layer coating the base. Examples of the material of the coating layer include carbide, nitride, oxide, carbonate, nitroxide, carbonitride, and oxycarbonitride of titanium. The coating layer may contain only one of the above-described materials or a plurality of the above-described materials. The coating layer may include only one layer or a plurality of layers. Note that the material of the coating layer is not limited to these materials. The coating layer can be positioned on the base by using a chemical vapor deposition (CVD) method or a physical vapor deposition (PVD) method.

In a case of the rotary tool 1 in which the holder 110 and the insert 101 are constituted by one member, the material the same as and/or similar to the material of the insert 101 can be used as the material of the member.

The invention according to the present disclosure has been described above based on the various drawings and examples. However, the invention according to the present disclosure is not limited to each embodiment described above. That is, the embodiments of the invention according to the present disclosure can be modified in various ways within the scope illustrated in the present disclosure, and embodiments obtained by appropriately combining the technical means disclosed in different embodiments are also included in the technical scope of the invention according to the present disclosure. In other words, note that a person skilled in the art can easily make various variations or modifications based on the present disclosure. Note that these variations or modifications are included within the scope of the present disclosure.

REFERENCE SIGNS

1, 100 Rotary tool
3 Body
10 Cutting portion
11 Cutting edge
11-1 First cutting edge
11-2 Second cutting edge
12 Flute
12-1 First flute
12-2 Second flute
13 Flank face
13-1 First flank face
13-2 Second flank face
15 Recessed portion
15-1 First recessed portion
15-2 Second recessed portion
15*a* First portion
15*b* Second portion
16 Inner edge
16-1 First inner edge
16-2 Second inner edge
16*a* Thinning edge
17 Outer edge

17-1 First outer edge
17-2 Second outer edge
20 Recessed groove
20-1 First recessed groove
20-2 Second recessed groove
21 First surface
22 Second surface
23 Bottom portion
23-1 First bottom portion
23-2 Second bottom portion
101 Insert
102 Main body (body)
103 Shaft portion
110 Holder
113 Pocket
R Ridge line
R-1 First ridge line
R-2 Second ridge line
R1 Rotation axis
R2 Rotation direction
θ1(1) First inner rake angle
θ1(2) Second inner rake angle
θ2(1) First outer rake angle
θ2(2) Second outer rake angle
α1 First inclination angle
α2 Second inclination angle

The invention claimed is:

1. A cutting insert, comprising:

a body extending from a first end to a second end along a rotation axis, wherein the body comprises a first flank face positioned at a side of the first end, a first flute extending from the first flank face toward the second end, and a first ridge line positioned at an intersection of the first flank face and the first flute, the first ridge line comprises a first recessed portion recessed toward the second end, a first inner edge extending from the first recessed portion toward a center portion of the body through which the rotation axis passes, and a first outer edge extending from the first recessed portion toward an outer periphery of the body, the first flute comprises a first recessed groove extending along the first outer edge, the first recessed groove is connected to the first recessed portion and the first outer edge, and is separated from the first inner edge, the first recessed groove comprises a first surface extending along the first outer edge, a second surface positioned closer to the second end than the first surface, the second surface being inclined with respect to the first surface, and a first bottom portion positioned between the first surface and the second surface, the first bottom portion being a transition surface between the first surface and the second surface, and the first bottom portion becomes closer to the first outer edge as the first bottom portion approaches the outer periphery of the body.

2. The cutting insert according to claim 1, wherein a width of the second surface in a direction along the rotation axis becomes larger as the second surface approaches a surface of the outer periphery.

3. The cutting insert according to claim 1, wherein a rake angle of the first inner edge is a first inner rake angle, and a rake angle of the first outer edge is a first outer rake angle, and the first outer rake angle is larger than the first inner rake angle.

4. The cutting insert according to claim 3, wherein the first outer edge comprises a portion in which the first outer rake angle becomes larger toward the outer periphery of the body.

5. The cutting insert according to claim 1, wherein the first recessed portion comprises a first portion connected to the first recessed groove, and a second portion separated from the first recessed groove, and the first portion is longer than the second portion.

6. The cutting insert according to claim 1, wherein the body further comprises a second flank face positioned at the first end, a second flute extending from the second flank face toward the second end, and a second ridge line positioned at an intersection of the second flank face and the second flute, the second ridge line comprises a second recessed portion recessed toward the second end, a second inner edge extending from the second recessed portion toward the center portion of the body, and a second outer edge extending from the second recessed portion toward the outer periphery of the body, the second flute comprises a second recessed groove extending along the second outer edge, the second recessed groove is connected to the second recessed portion and the second outer edge, and is separated from the second inner edge, and the second recessed portion is positioned closer to the outer periphery of the body than the first recessed portion.

7. The cutting insert according to claim 6, wherein the second surface is inclined in a direction protruding with respect to the first surface, the first bottom portion has a linear shape, the second recessed groove comprises a third surface extending along the second outer edge, a fourth surface positioned closer to the second end than the third surface, the fourth surface being inclined in a direction protruding with respect to the third surface, and a second bottom portion having a linear shape, the second bottom portion being positioned between the third surface and the fourth surface, and an angle between the rotation axis and the first bottom portion in a side view of the cutting insert along a direction perpendicular to the rotation axis is defined as a first inclination angle, and an angle between the rotation axis and the second bottom portion in the side view is defined as a second inclination angle, and the second inclination angle is larger than the first inclination angle.

8. The cutting insert according to claim 6, wherein a rake angle of the first outer edge is defined as a first outer rake angle, and a rake angle of the second outer edge is defined as a second outer rake angle, and the second outer rake angle is larger than the first outer rake angle.

9. The cutting insert according to claim 8, wherein a rake angle of the first inner edge is defined as a first inner rake angle, and a rake angle of the second inner edge is defined as a second inner rake angle, and the first inner rake angle is identical to the second inner rake angle.

10. A rotary tool, comprising:

a holder comprising a pocket positioned at a side of a tip end; and the cutting insert according to claim 1, the cutting insert being positioned at the pocket.

11. The cutting insert according to claim 1, wherein the first bottom portion has a linear shape.

12. The cutting insert according to claim 1, wherein the first recessed groove becomes closer to the first outer edge as the first bottom portion approaches the outer periphery of the body, and a width of the second surface becomes larger as the second surface approaches the outer periphery of the body.

13. A rotary tool, comprising:

a body comprising a rotation axis, the body having a rod shape extending from a first end to a second end;

a first flank face positioned at a side of the first end of the body;

a first flute extending from the first flank face toward the second end; and a first ridge line positioned at an intersection of the first flank face and the first flute, wherein the first ridge line comprises a first recessed portion recessed toward the second end, a first inner edge extending from the first recessed portion toward a center portion of the body through which the rotation axis passes, and a first outer edge extending from the first recessed portion toward an outer periphery of the body, the first flute comprises a first recessed groove extending along the first outer edge, the first recessed groove is connected to the first recessed portion and the first outer edge, and is separated from the first inner edge, the first recessed groove comprises a first surface extending along the first outer edge, a second surface positioned closer to the second end than the first surface, the second surface being inclined with respect to the first surface, and a first bottom portion positioned between the first surface and the second surface, the first bottom portion being a transition surface between the first surface and the second surface, and the first bottom portion becomes closer to the first outer edge as the first bottom portion approaches the outer periphery of the body.

14. A method for manufacturing a machined product, the method comprising:

rotating the rotary tool according to claim 10;

bringing the rotary tool into contact with a workpiece; and separating the rotary tool from the workpiece.

* * * * *